R. SMITH.
Improvement in Milk-Coolers.
No. 129,610.  Patented July 16, 1872.
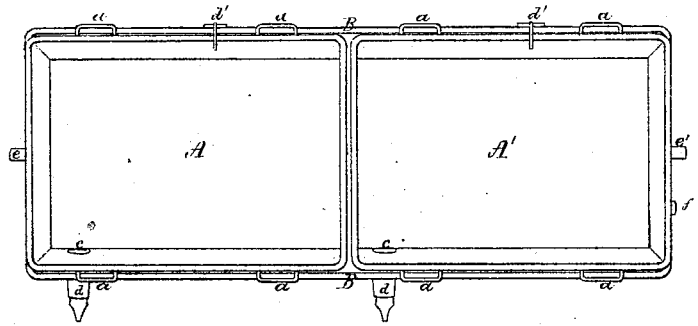
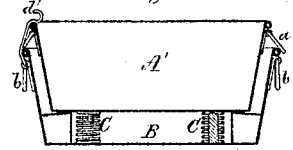
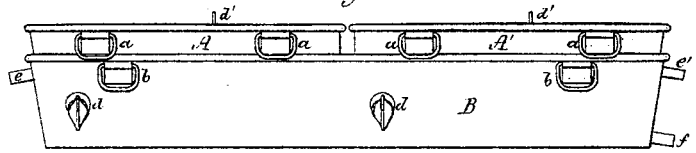
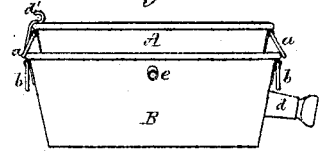
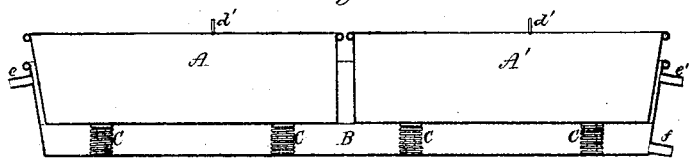
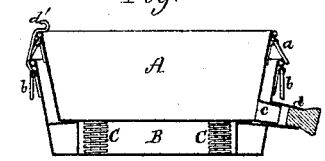
Witnesses.
S. N. Piper
L. N. Mollen
Russell Smith.
by his attorney.

UNITED STATES PATENT OFFICE.

RUSSELL SMITH, OF RICHFORD, VERMONT.

IMPROVEMENT IN MILK-COOLERS.

Specification forming part of Letters Patent No. 129,610, dated July 16, 1872.

*To all persons to whom these presents may come:*

Be it known that I, RUSSELL SMITH, of Richford, in the county of Franklin and State of Vermont, have invented a new and useful Apparatus for Obtaining Cream from Milk; and do hereby declare the same to be fully described in the following specification and represented in the accompanying drawing, of which—

Figure 1 is a top view, Fig. 2 a side elevation, Fig. 3 a longitudinal section, Fig. 4 an end view, and Figs. 5 and 6 transverse sections of it.

The said drawing exhibits two pans, A A', arranged within a trough or cooling-vessel, B, each pan resting upon one or more springs, C, fixed to the bottom of the cooling-vessel. Furthermore, to each pan there are handles $a$ $a$, applied to its opposite sides near its upper edge, and there are also similar handles $b$ $b$ to the cooling-vessel. Each pan is also furnished, at or near its bottom, with a tubular nozzle or educt, $c$, which enters and fits tightly a corresponding tubular educt, $d$, opening out of and projecting from one side of the cooling-vessel. There is pivoted to the cooling-vessel one or more latches, $d'$, formed and arranged as shown, such latches being for the purpose of holding down the pan when at its lowest position within the cooling-vessel. Such cooling-vessel has at the upper part of each end an opening or pipe, as shown at $e$ or $e'$, and, besides this, it has projecting from it, at one end and close to its bottom, an eduction-tube, $f$, which, while the apparatus is in use, is to be kept properly plugged. The same may be said with respect to each of the side educts of the cooling-vessel.

I would remark that I use one or more of the pans in the cooling-vessel; and when such pan or pans are supplied with milk, cold water is to be allowed to flow into and out of the cooling-vessel, so as to surround the milk-pan or pans and keep the contents thereof at a proper temperature.

I make no claim to one or more pans and a cooling-vessel arranged as shown, my invention consisting, principally, in the combination of such, the elevating spring or springs, the latch or latches, and the educts, fitting together as shown. The purpose of the spring or springs is to save the labor of elevating the pan or pans out of the water preparatory to scalding and cleansing such after the skimmed milk may have been discharged therefrom.

On unlatching the latch to each pan, the springs will raise the pan out of the water of the cooling-vessel, and maintain it in its elevated position during the operation of scalding and cleansing it, after which it may be depressed and latched down ready for use.

I claim as my invention—

1. The milk pan or pans A A' and cooling-vessel, provided with one or more springs, C, for supporting the pan or pans and elevating such within the said cooling-vessel B.

2. I also claim the milk pan or pans, provided with elevating-springs and means of locking down the pan or pans, and also with the separate educts $c$ $d$, to fit together, all being arranged and to operate substantially in manner as set forth.

RUSSELL SMITH.

Witnesses:
N. E. SMITH,
GEO. W. GIBSON.